US012641062B2

(12) United States Patent
Kurian et al.

(10) Patent No.: US 12,641,062 B2
(45) Date of Patent: May 26, 2026

(54) SECURITY REPLICATOR FOR PERSONAL ARTIFICIAL INTELLIGENCE SYSTEM

(71) Applicant: Bank of America Corporation, Charlotte, NC (US)

(72) Inventors: Manu Kurian, Dallas, TX (US); Ana Maxim, Arlington, VA (US); Vinesh Patel, London (GB); Michael Young, Davidson, NC (US)

(73) Assignee: Bank of America Corporation, Charlotte, NC (US)

( * ) Notice: Subject to any disclaimer, the term of this patent is extended or adjusted under 35 U.S.C. 154(b) by 169 days.

(21) Appl. No.: 18/225,763

(22) Filed: Jul. 25, 2023

(65) Prior Publication Data

US 2025/0039149 A1 Jan. 30, 2025

(51) Int. Cl.
*H04L 9/40* (2022.01)
*G06N 20/00* (2019.01)

(52) U.S. Cl.
CPC .............. *H04L 63/029* (2013.01); *H04L 9/40* (2022.05); *G06N 20/00* (2019.01); *H04L 63/00* (2013.01); *H04L 63/0263* (2013.01); *H04L 63/20* (2013.01)

(58) Field of Classification Search
CPC ......... H04L 9/40; H04L 63/029; H04L 63/20; H04L 63/0263; H04L 63/00; G06N 20/00
See application file for complete search history.

(56) References Cited

U.S. PATENT DOCUMENTS

| | | | | |
|---|---|---|---|---|
| 10,970,116 B2 * | 4/2021 | Krauss | .................. | G06F 9/5016 |
| 2019/0180189 A1 * | 6/2019 | Biesemann | .............. | G06N 3/10 |
| 2019/0342286 A1 * | 11/2019 | Cobb | ................... | G06V 10/764 |

FOREIGN PATENT DOCUMENTS

| | | | | | |
|---|---|---|---|---|---|
| CN | 114692828 A | * | 7/2022 | ............. | G06F 18/24 |

OTHER PUBLICATIONS

"The Importance of Synchronizing Siloed Security Solutions"—Yoram Salinger, Perception Point, Venture Beat, Feb. 26, 2023 https://venturebeat.com/security/the-importance-of-synchronizing-siloed-security-solutions (Year: 2023).*
"Challenges to the Reproducibility of Machine Learning Models in Health Care"—Beam et al, American Medical Association, Jan. 6, 2020 https://statmodeling.stat.columbia.edu/wp-content/uploads/2020/01/jama_beam_2020_vp_190172.pdf (Year: 2020).*

* cited by examiner

*Primary Examiner* — Randy A Scott

(74) *Attorney, Agent, or Firm* — Weiss & Arons LLP

(57) ABSTRACT

A personal artificial intelligence (AI) system may be used to conduct business with one or more entities. The personal AI system may automatically replicate security rules from another AI system to provide initial security rules and may adjust the initial security rules based on information about the user to generate revised security rules. The rules adjustments may also be based on the entities with which the user does business. An AI firewall may be generated to control access to the personal AI system by a second AI system, with which business may be conducted. To permit interactions with the second AI system, the AI firewall may require that the second AI system provide the personal AI system with data relating to previous transactions between the user and the operator of the second AI system. The data may include the monetary amount of each of multiple recent transactions.

20 Claims, 4 Drawing Sheets

400

AUTOMATICALLY REPLICATING AT PERSONAL
AI SYSTEM SECURITY RULES FROM
OTHER AI SYSTEM ⟋410

ADJUSTING THE SECURITY RULES TO GENERATE
REVISED RULES AT THE PERSONAL AI SYSTEM ⟋420

GENERATE AN AI FIREWALL ⟋430

COLLECTING DATA RELATED TO USER OF
PERSONAL AI SYSTEM AND ANOTHER ENTITY ⟋440

SECURITY REPLICATOR FOR PERSONAL ARTIFICIAL INTELLIGENCE SYSTEM

FIELD OF THE DISCLOSURE

Aspects of the disclosure relate to creating a personal artificial intelligence (AI) system that includes secure access controls for conducting business interactions.

BACKGROUND OF THE DISCLOSURE

Merchants and consumers may prefer to interact, such as to transact business, with each other using AI systems. However, efforts to establish a personal AI system for a consumer or a merchant, particularly a small business, may prove difficult and costly. One of the challenges is to establish security rules for access control to enable safe interactions between the personal AI system and other AI systems.

SUMMARY OF THE DISCLOSURE

It is an object of this invention to simplify the generation of security rules for personal AI systems and enable users to more readily set up their own AI systems to interact.

A personal artificial intelligence (AI) system may be provided for a user to conduct business. The system may include an interface to interact with an entity with which the user conducts business via a second AI system used by the entity. The system may include an access control engine that controls interactions between the personal AI system and the second AI system. The access control engine may be configured to automatically replicate at the personal AI system security rules that are implemented at the second AI system or at a third AI system, which may be operated by a different user, to provide an initial set of security rules at the personal AI system. The access control engine may be configured to adjust the initial set of security rules at the personal AI system based on information about the user to generate a revised set of security rules. The adjustment may also be based on information about the entity. The security rules may include rules for maintaining security at an AI system by controlling access to the AI system. The revised set of security rules may include rules for identifying and interacting with the entity via the second AI system.

The access control engine may be configured to generate an AI firewall to prevent access by infiltrators to interact with the personal AI system and to verify trust in the second AI system by requiring that the second AI system provide data relating to predetermined transactions with the user. The data relating to the predetermined transactions may include a monetary amount of each of a plurality of recent transactions. The AI firewall may be configured to be trained to understand anti-patterns to distinguish between humans and other AI systems.

The access control engine may be configured to control access by the second AI system to the personal AI system by specifying a decision whether to allow, hold, or deny access to the personal AI system.

The personal AI system may include a second interface to a personal AI security coach to assist in adjusting the initial set of security rules or the revised set of security rules.

A data collection engine may be configured to collect, from the second AI system, data related to transactions between the user and the entity. The collected data may relate to the user and may be maintained separately from, and not used in, a data set for generating a machine learning model at the personal AI system.

Where the entity is a merchant and the user is a customer of the merchant, the access control engine may be configured to adjust the initial set of security rules to provide merchant-specific security rules for interactions between the personal AI system and the merchant.

Where the user is a merchant that operates the personal AI system and the entity is a customer of the merchant, the access control engine may be used by the merchant to provide the customer with access to and account of the customer or interactions of the customer with the merchant. The personal AI system may be configured for the merchant to categorize and approve transactions with customers on a per-customer basis.

The personal AI system may include a marketing tools intelligence agent that may be configured to provide a customer with customer-targeted marketing materials.

A method in accordance with the present disclosure may establish controls for secure interactions between a personal AI system of a user and an entity with which the user transacts business via a second AI system used by the entity. The method may include automatically replicating the personal AI system security rules at the second AI system or at a third AI system, which may be operated by a different user, to provide an initial set of security rules at the personal AI system. The method may include adjusting the initial set of security rules at the personal AI system based on information about the user to generate a revised set of security rules. The adjustment may also be based on information about the entity. The revised set of security rules may include rules for identifying and interacting with the entity via the second system.

The method may include generating an AI firewall to prevent access by infiltrators to interact with the personal AI system and to verify trust in the second AI system by requiring that the second AI system provide data relating to predetermined transactions with the user. The data may relate to the predetermined transactions and may include a monetary amount of each of a plurality of recent transactions. The method may include collecting, from the second AI system, data related to transactions between the user and the entity. The collected data may relate to the user and may be maintained separately from, and may not be used in, a data set for generating a machine learning model at the personal AI system.

Where the entity is a merchant and the user is a customer of the merchant, the method may include adjusting the initial set of security rules to provide merchant-specific security rules for interactions between the personal AI system and the merchant.

Where the user is a merchant that operates the personal AI system and the entity is a customer of the merchant, the personal AI system may be used by the merchant to provide the customer with access to and account of the customer or interactions of the customer with the merchant. The personal AI system may be configured for the merchant to categorize and approve transactions with customers on a per-customer basis.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
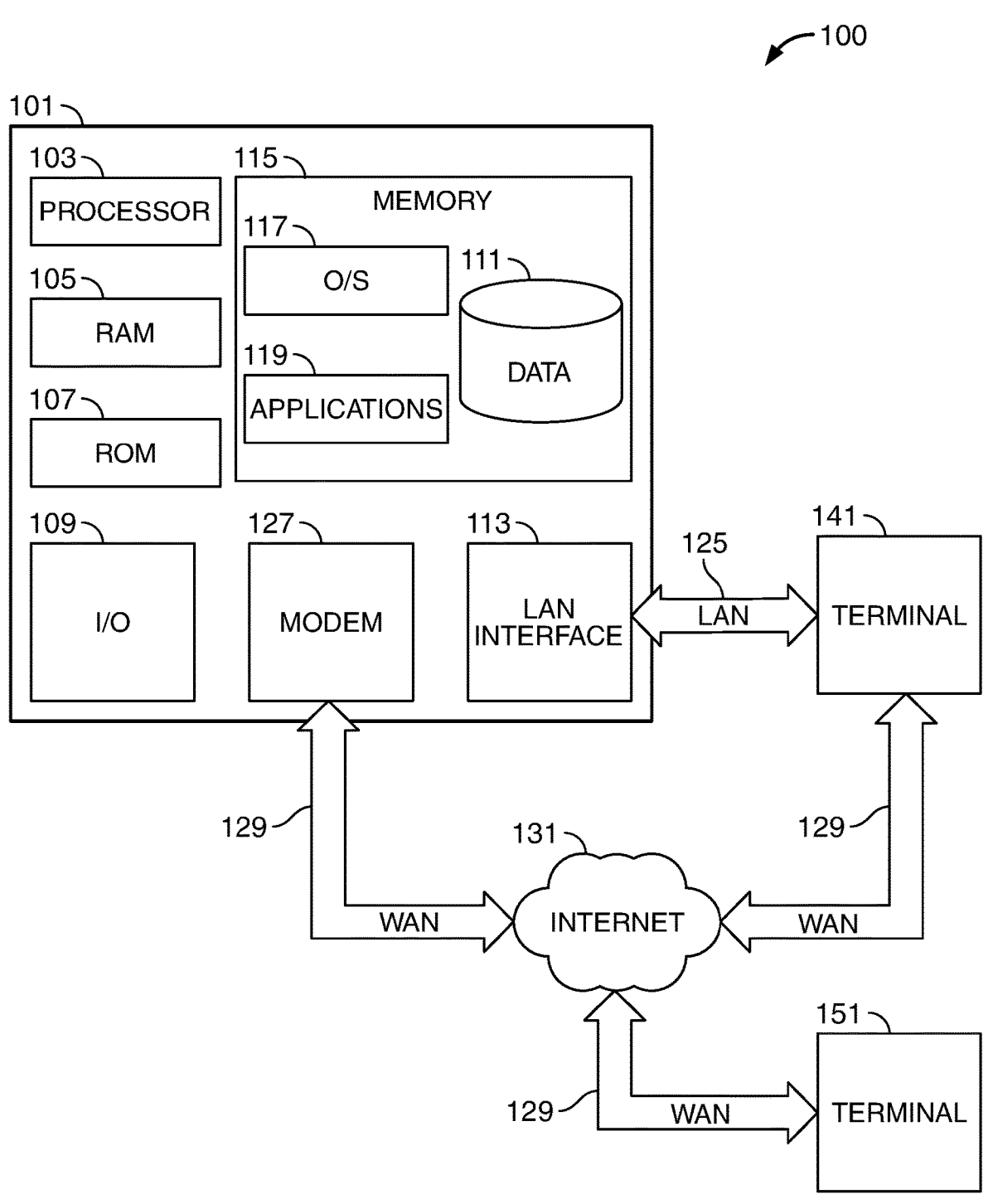
FIG. 1 shows an illustrative system architecture in accordance with principles of the disclosure.

The present disclosure relates to systems, methods, and apparatus for establishing a personal AI system that may be leveraged to connect customers and merchants quickly and efficiently and to enable interactions between them. The personal AI systems, methods and apparatus may offer a hyper-personalized AI platform for customers and merchants (including vendors). The personal AI system may be packaged as a system that is available to both the customer and the merchant. The personal AI system may enable quick and efficient connections by handling transactions behind the scenes. The personal AI system may leverage the power of personal business interactions and connections. The configurable set of AI rules may identify, categorize, and approve other AI systems with which interactions are permitted. The personal AI system may provide a force field against unfamiliar AI infiltrators.

The personal AI system may provide a secure channel or workspace for customer-merchant interactions. Interactions may include any type of interaction such as, for example, communications, exchanges of information, negotiations, or transactions. The system may be customized for individual customers or merchants. The personal AI system may connect with another AI system, which may be another personal AI system.

The personal AI system may initially adopt security rules by obtaining the security rules from another AI system and replicate them at the personal AI system. The security rules may then be adjusted (tuned) to address the needs of a user of the personal AI system, such as a customer or a merchant (e.g., a seller or a vendor). The adjustment may be based on user information, such as information learned about the user, the user's previous dealings with the entity or other party, or the user's risk profile. The adjustment may also account for a user's specification of its risk preferences. Additional adjustments to the security rules may be made over time. The personal AI system may also be tuned to detect personal security exposure. The security exposure may be tuned to take on varying degrees of security exposure for an individual customer or merchant.

A configurable set of AI security rules may identify, categorize, and approve other AI systems with which the personal AI system may interact. The personal AI system may also include an AI firewall (a "force field") that may prevent unfamiliar infiltrators from accessing the personal AI system.

The personal AI system may be configured to detect personal security exposure of the user of the personal AI system to an AI system of an entity, which may be, for example, a customer or merchant. The system may be customized to permit varying degrees of security exposure for a particular customer or merchant. For example, where a user of the personal AI system is a customer and is potentially going to interact with a significant merchant or type of merchant using the personal AI system, the allowed security exposure of the personal AI system may be permitted to be greater for that merchant than if the merchant were less significant to that customer. Similarly, where a user of the personal AI system is a merchant, the tunable security exposure feature may allow customer segmentation so that the allowed security exposure may differ depending on the customer or the type of customer having certain characteristics. The security exposure may also be customized depending on other factors, such as the type of interaction or the size of a potential transaction.

The security exposure of the personal AI system may be controlled by an access control engine. The access control engine may automatically replicate the security rules of another AI system and adjust the security rules based on information about the user.

The access control engine may also generate an AI firewall that may prevent access by infiltrators to interact with the personal AI system. The AI firewall may also verify trust in another AI system before the personal AI system interacts with the other AI system. The AI firewall may verify trust in the other AI system by requiring, among other things, that the other AI system provide data relating to predetermined transactions involving the user. The predetermined transactions may include a monetary amount of a predetermined number of recent transactions between a customer and a merchant. For example, the other system may be requested to verify six most recent transactions with the user of the personal AI system. If the data provided correctly matches the recent transactions, access to the personal AI system may be granted. Likewise, the personal AI system may provide, upon request, the same type of information from the personal AI system to another AI system with which it may communicate to establish trust with that AI system.

The personal AI system may enable trustless interactions with the other AI system by permitting interactions between the personal AI system and another AI system with which the personal AI system are familiar. Thus, the interactions may proceed without monitoring by a trusted third party.

The AI firewall may also be trained to understand inflections of users of AI systems. The AI firewall may pose "off-the-wall" questions to those who wish to potentially interact with the personal AI system to screen for other AI systems that are attempting access. The use of anti-patterns, which would not typically be used by AI systems, such as incorrect inflections or answers to the off the wall questions that would not be typically asked, may be taught to the personal AI system to distinguish between humans and other AI systems.

The access control engine may be configured to control access by the second AI system to the personal AI system by specifying a decision whether to allow, hold, or deny access to the personal AI system.

The personal AI system may enable access to private data. The data may be collected by a data collection engine. The collected data may relate to interactions between the user of the personal AI system and another entity. The private data may be used by the personal AI system, for example, for machine learning about a particular customer or merchant, marketing purposes, security purposes or other reasons. The private data may include private customer data, private merchant data, or both. The private data may be stored at a database at the personal AI system or at a data store in communication with the personal AI system. The private data to which the personal AI system has access may also be available at one or more other AI systems with which the personal AI system interacts. The personal AI system may obtain permission to access the private data for a time period, which may be predetermined. The time period may be, for example, but not limited to, a short term time period (e.g., now), or a longer term time period, such as 1, 2, 3, 4, 5, or 10 years from the date that the data was accessed.

The private data that may be accessed may be data regarding customer or merchant accounts. The private data that may be accessed may include data related to mortgage decisions as to whether to grant a mortgage to the user, best living situations for a consumer, and renting versus buying information.

The personal AI system may be focused (i.e., have a use with a particular focus) or unfocused in nature. The personal AI system may research other AI systems behind the scenes and curate a portfolio of communications designed for a customer or merchant. The personal AI system may curate, collect, research, document, and reach out to third parties or fourth parties (i.e., a party who works for the third party) for data. The curated data may be presented in a sandbox or proposal format in which the collected data may be maintained for analysis separately from, and is not used in, a data set for generating a machine learning model at the personal AI system.

The personal AI system may have customizable marketing tools at the personal AI system or available to the personal AI system. These tools may be used as intelligence agents which may act to autonomously capture data about users of other AI systems to improve marketing to the users of the other systems. For example, a merchant may employ marketing tools on its personal AI system to better target customers or potential customers with marketing efforts, such as customer-targeted marketing materials.

Illustrative embodiments of methods, systems, and apparatus in accordance with the principles of the invention will now be described with reference to the accompanying drawings, which form a part hereof. It is to be understood that other embodiments may be used, and structural, functional, and procedural modifications may be made without departing from the scope and spirit of the present invention.

The drawings show illustrative features of methods, systems, and apparatus in accordance with the principles of the invention. The features are illustrated in the context of selected embodiments. It will be understood that features shown in connection with one of the embodiments may be practiced in accordance with the principles of the invention along with features shown in connection with another of the embodiments.

The methods, apparatus, computer program products, and systems described herein are illustrative and may involve some or all the steps of the illustrative methods and/or some or all of the features of the illustrative system or apparatus. The steps of the methods may be performed in an order other than the order shown or described herein. Some embodiments may omit steps shown or described in connection with the illustrative methods. Some embodiments may include steps that are not shown or described in connection with the illustrative methods, but rather are shown or described in a different portion of the specification.

FIG. 1 shows an illustrative block diagram of system 100 that includes computer 101. Computer 101 may alternatively be referred to herein as an "engine," "server" or a "computing device." Computer 101 may be any computing device described herein, such as the computing devices running on a computer, smart phones, smart cars, smart cards, and any other mobile device described herein. Elements of system 100, including computer 101, may be used to implement various aspects of the systems and methods disclosed herein.

Computer 101 may have a processor 103 for controlling the operation of the device and its associated components, and may include RAM 105, ROM 107, input/output circuit 109, and a non-transitory or non-volatile memory 115. Machine-readable memory may be configured to store information in machine-readable data structures. Other components commonly used for computers, such as EEPROM or Flash memory or any other suitable components, may also be part of the computer 101.

Memory 115 may be comprised of any suitable permanent storage technology—e.g., a hard drive. Memory 115 may store software including the operating system 117 and application(s) 119 along with any data 111 needed for the operation of computer 101. Memory 115 may also store videos, text, and/or audio assistance files. The data stored in Memory 115 may also be stored in cache memory, or any other suitable memory.

Input/output ("I/O") module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

Computer 101 may be connected to other systems via a local area network (LAN) interface 113. Computer 101 may operate in a networked environment supporting connections to one or more remote computers, such as terminals 141 and 151. Terminals 141 and 151 may be personal computers or servers that include many or all the elements described above relative to computer 101.

In some embodiments, computer 101 and/or Terminals 141 and 151 may be any of mobile devices that may be in electronic communication with consumer device 106 via LAN, WAN, or any other suitable short-range communication when a network connection may not be established.

When used in a LAN networking environment, computer 101 is connected to LAN 125 through a LAN interface 113 or an adapter. When used in a WAN networking environment, computer 101 may include a communications device, such as modem 127 or other means, for establishing communications over WAN 129, such as Internet 131.

In some embodiments, computer 101 may be connected to one or more other systems via a short-range communication network (not shown). In these embodiments, computer 101 may communicate with one or more other terminals 141 and 151, such as the mobile devices described herein etc., using a personal area network (PAN) such as Bluetooth®, NFC (Near Field Communication), ZigBee, or any other suitable personal area network.

It will be appreciated that the network connections shown are illustrative and other means of establishing a communications link between computers may be used. The existence of various well-known protocols such as TCP/IP, Ethernet, NFT, HTTP, and the like is presumed, and the system can be operated in a client-server configuration to permit retrieval of data from a web-based server or API (Application Programming Interface). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application programs 119 may use one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may use the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 119 may include one or more algorithms that may be used to implement features of the disclosure.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting and/or displaying relevant information. Terminal 151 and/or terminal 141 may be one or more user devices. Terminals 151 and 141 may be identical to computer 101 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smartphones, multiprocessor systems, microprocessor-based systems, cloud-based systems, programmable consumer electronics, network PCs, minicomputers, mainframe computers, distributed computing environments that include any of the above systems or devices, and the like.

Figure 2:
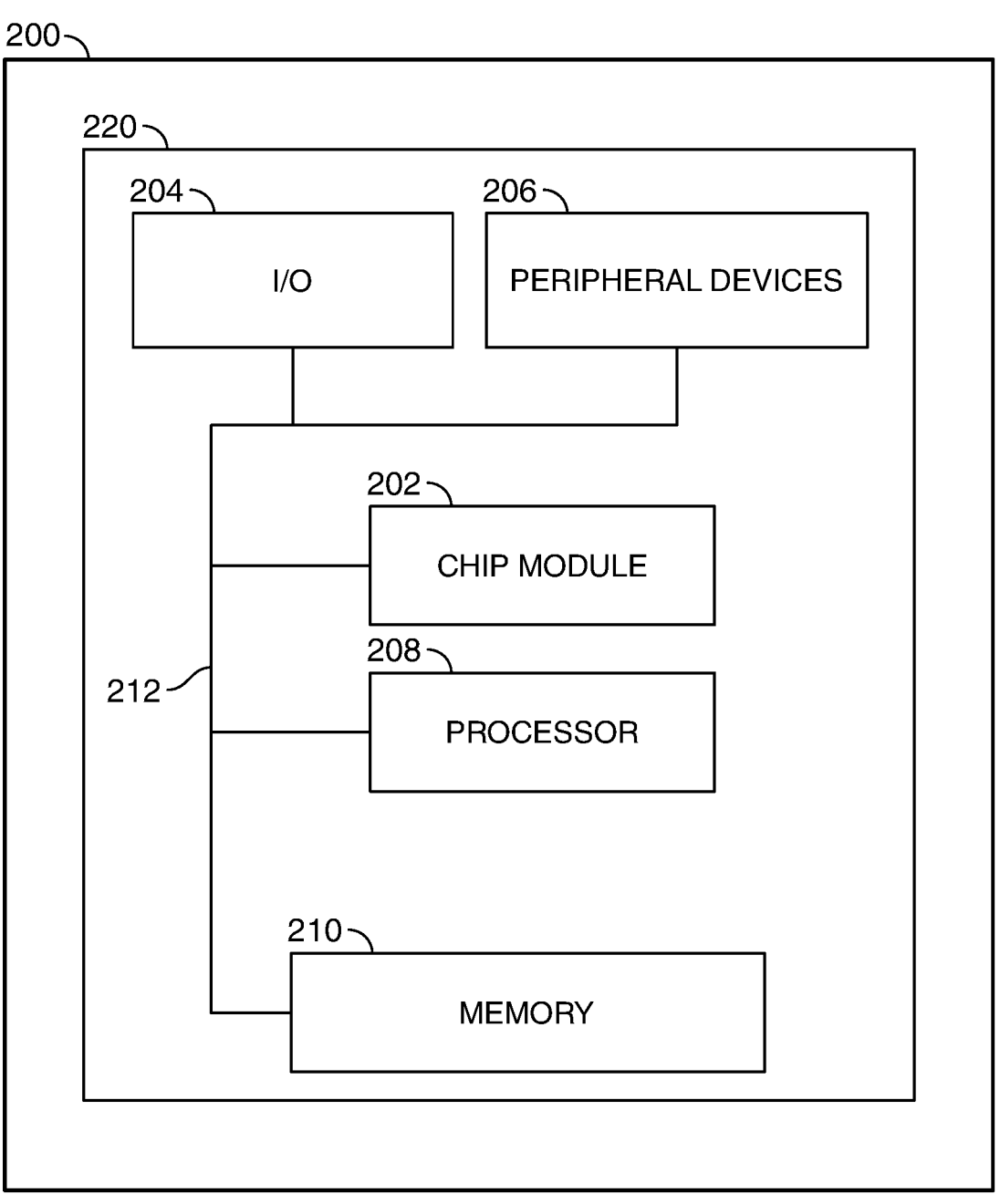
FIG. 2 shows an illustrative apparatus of a device in accordance with principles of the disclosure.

FIG. 2 shows illustrative apparatus 200, which may be a computing device. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
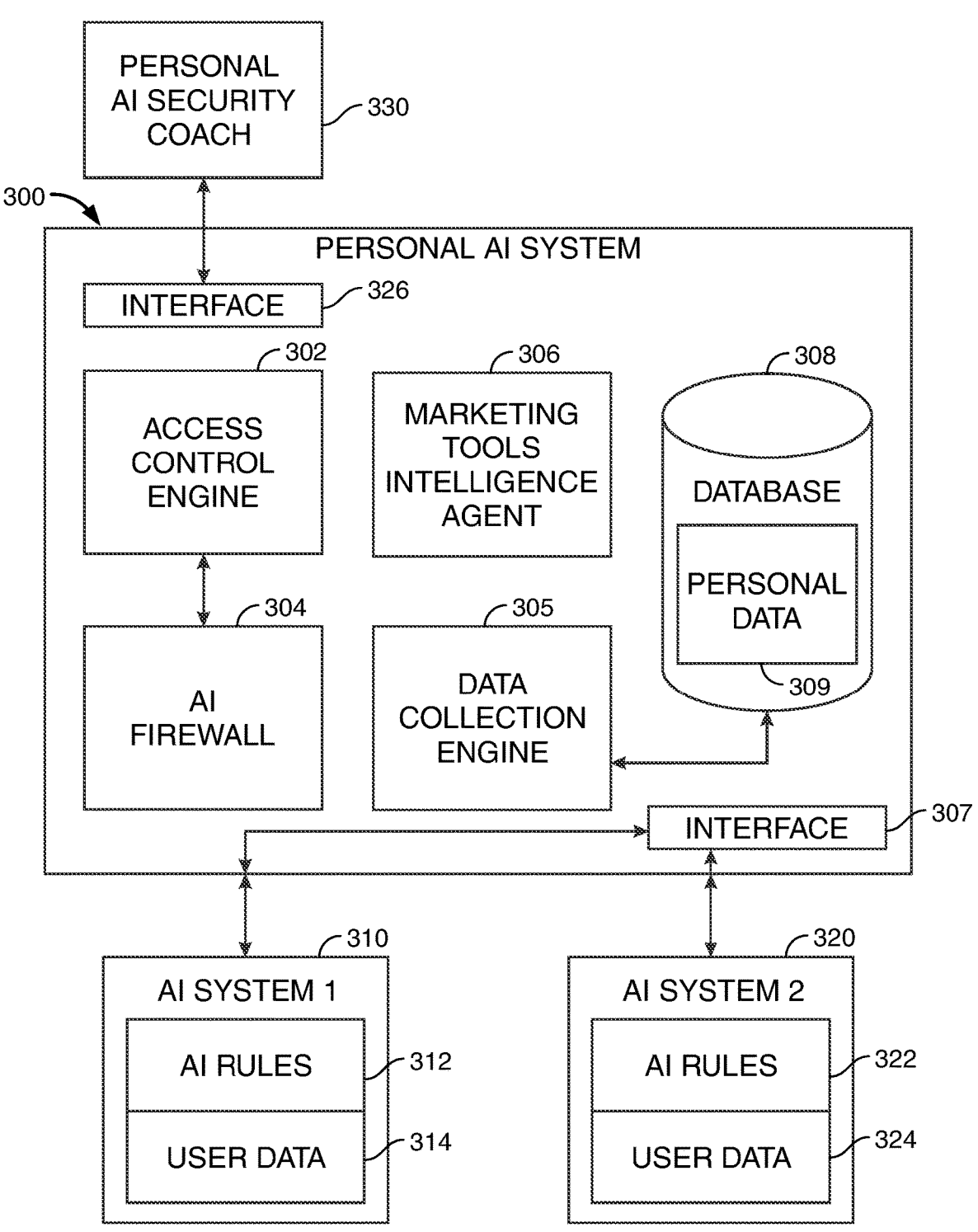
FIG. 3 shows an illustrative system for conducting business interactions between a personal AI system and another AI system in accordance with principles of the disclosure.

FIG. 3 shows an illustrative personal AI system 300 for a user in accordance with the disclosure. System 300 may be used to conduct business. A user may be a customer or merchant. Where the user is a customer of a merchant, the customer may conduct business using system 300 with a merchant. Where the user is a merchant, the merchant may conduct business with a customer using system 300. The merchant may be a merchant of any size and may be a vendor.

The customer or merchant that conducts business with the user of system 300 may operate its own AI system, such as, for example, AI system 310 or AI system 320. AI system 310 may include its own AI rules 312, which may include security rules for system 310, and may include user data 314 for the user of system 300. User data 314 may include data related to interactions with the user of personal AI system 300, such as business transactions that AI system 310 has conducted with the user of system 300. Another AI system 320 may also interact with personal AI system 300 and may include its own AI rules 322 and user data 324 that relates to data relating to interactions with the user of system 300.

Personal AI system 300 may include an access control engine 302 and an AI firewall 304 that may be generated by AI and interact with access with access control engine 302. The access control engine may automatically replicate the security rules of another AI system and adjust the security rules based on information about the user.

Access control engine 302 may also generate AI firewall 304 that may prevent access by infiltrators to interact with personal AI system 300. AI firewall 304 may also verify trust in another AI system before personal AI system 300 interacts with the other AI system. AI firewall 304 may verify trust in the other AI system by requiring, among other things, that the other AI system provide data relating to predetermined transactions involving the user. The predetermined transactions may include a monetary amount of a predetermined number of recent transactions between a customer and a merchant. For example, the other system may be requested to verify six most recent transactions with the user of personal AI system 300. If the data provided correctly matches the recent transactions, access to personal AI system 300 may be granted. Likewise, personal AI system 300 may be requested to provide the same type of information from the personal AI system to another AI system with which it may communicate to establish trust with that AI system.

Personal AI system 300 may obtain its initial set of security rules from AI system 310 or AI system 320 or from a different AI system that has not previously interacted with the user of personal AI system 300. Personal AI system 300 may communicate and interact with AI system 310 or AI system 320 over interface 307.

Personal AI system 300 may also include a data collection engine 305 that may be used to collect information about the user of system 300 and about one or more entities with which the user may have interacted, such as to communicate or conduct business. Data collection engine 305 may collect other types of information, such as information about security risks for the types and level of interactions in which the user and entity have engaged, a risk profile of the user that may indicate a level of risk that the user is willing to engage in, which may be based on past risk-taking, or a risk profile of the entity, such as risk in dealing with this entity.

Personal AI system 300 may also include a database 308 that may be used to store personal data 309 related to the user, including details about the user, its business dealings with other entities, and risk-taking profile, to name a few. Database 308 may also be used to store other information collected by data collection engine 305.

The data that is collected by data collection engine 305 may include private data. The private data may be stored with personal data at 309 in database 308. The private data may be used by the personal AI system, for example, for machine learning about a particular customer or merchant, marketing purposes, security purposes or other reasons. The private data may include private customer data, private merchant data, or both. The private data may be stored at database 308 of the personal AI system or at a data store (not shown) in communication with the personal AI system.

Some collected data may be maintained in a sandbox or proposal format in which the data may be maintained separately from, and not used in, a data set for generating a machine learning model at the personal AI system.

Access control engine 302 may communicate and interact with a packaged personal AI security coach, such as an AI security coach 330 that may be available from a third party to provide guidance to personal AI system regarding maintaining and revising the security rules generated by access control engine 302.

Customizable marketing tools may be available to personal AI system 300 and may be used as intelligence agents to generate and promote marketing. For example, a marketing tools intelligence agent 306 may be used to generate marketing efforts for promoting a business, such as the business of a merchant that may use personal AI system 300. Marketing tools intelligence agent 306 may be included within personal AI system 300 or may be outside of system 300 and may interact with system 300. The marketing tools may be customizable. These tools may be used as intelligence agents which may act to autonomously capture data about users of other AI systems to improve marketing to the users of the other systems. For example, a merchant may employ marketing tools on its personal AI system to better target customers or potential customers with marketing efforts, such as customer-targeted marketing materials.

Figure 4:
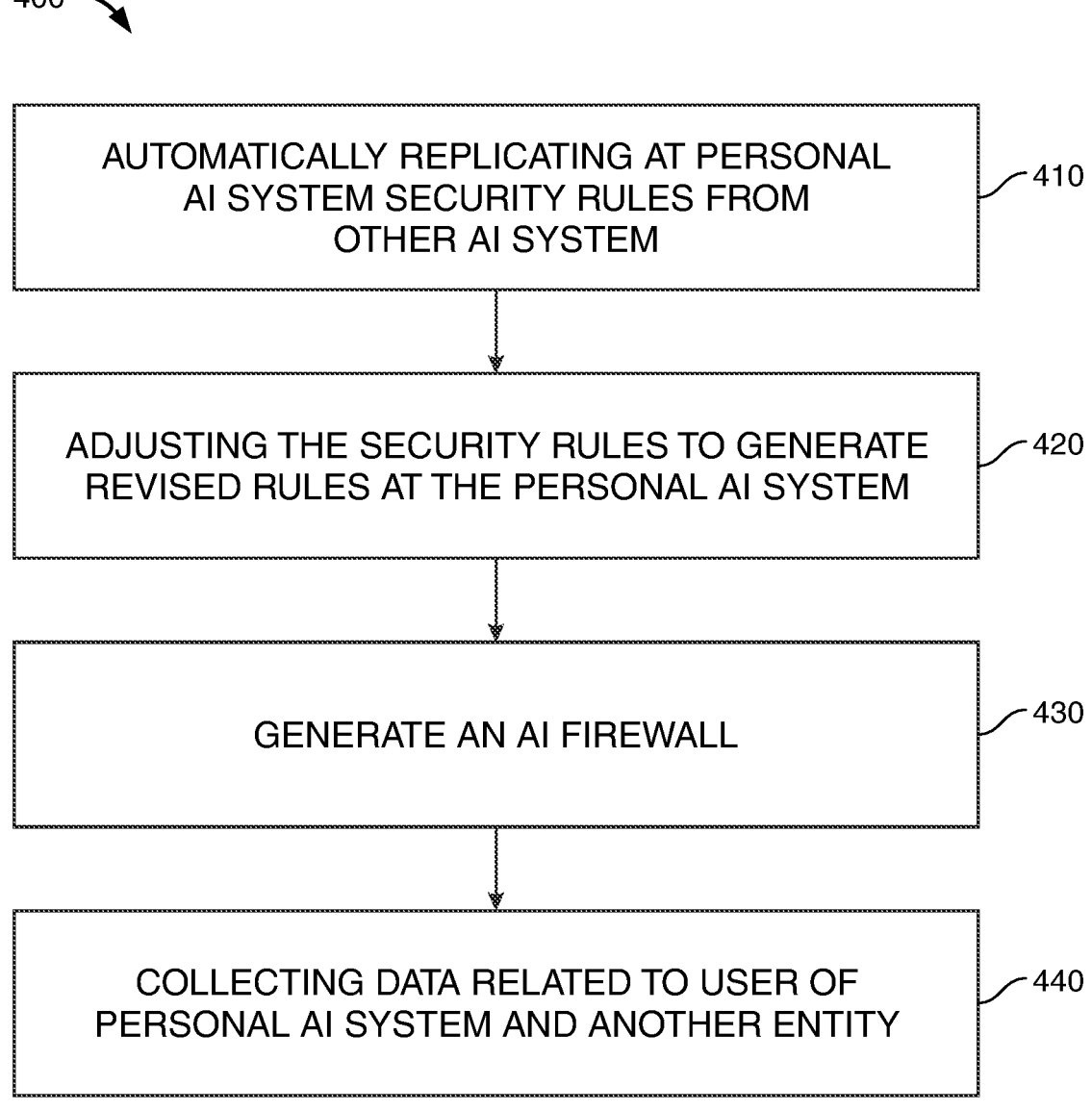
FIG. 4 shows an illustrative example of a flow chart for performing a method for conducting business interactions between a personal AI system and another AI system in accordance with principles of the disclosure.

FIG. 4 shows an illustrative example of a flow chart 400 for using a personal AI system. At step 410, as part of a setup of a personal AI system, an initial set of security rules may be established at the personal AI system by replicating a set of security rules from another AI system. The other AI system may be an actual AI system that has been in use or an AI system that may be used as a training AI system. At step 420, the initial set of security rules may be adjusted to generate a revised set of security rules for the personal AI system. The adjustment may be based on information about the user and its transaction history another other information. Additionally, at step 430, an AI firewall may be generated. At step 440, data related to a user of the personal AI system and other data, such as data for an entity that does business with the user of the personal AI system. The data collected at step 440 may be used to adjust the security rules.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods, systems, apparatuses, and computer program products may implement systems, methods, and apparatus for establishing a personal AI system for a user. Persons skilled in the art will appreciate that the present invention can be practiced by other than the described embodiments, which are presented for purposes of illustration rather than of limitation.

What is claimed is:

1. A personal artificial intelligence (AI) system for a user to conduct business, the system comprising:

a processor coupled to a memory;

an interface to interact with an entity with which the user conducts business via a second AI system used by the entity;

an access control engine, stored in the memory, that is configured to control access to the personal AI system to enable interactions between the personal AI system and the second AI system and is configured to, using the processor:

automatically replicate, at the personal AI system, security rules that are implemented at the second AI system and obtained from the second AI system or implemented at a third AI system and obtained from the third AI system to provide an initial set of security rules at the personal AI system; and adjust the initial set of security rules at the personal AI system based on information about the user of the personal AI system to generate a revised set of security rules to be implemented at the personal AI system;

wherein the revised set of security rules comprise rules for identifying and interacting with the entity via the second AI system.

2. The system of claim 1, wherein the access control engine is further configured to generate, using the processor, an AI firewall to prevent access by infiltrators to interact with the personal AI system and to verify trust in the second AI system by requiring that the second AI system provide data relating to predetermined transactions with the user.

3. The system of claim 2, wherein the data relating to the predetermined transactions comprises a monetary amount of each of a plurality of recent transactions.

4. The system of claim 2, wherein the AI firewall is configured to be trained to understand anti-patterns to distinguish between humans and other AI systems.

5. The system of claim 1, further comprising a data collection engine configured to collect, from the second AI system using the processor, data related to transactions between the user and the entity.

6. The system of claim 5, wherein the collected data related to the user is maintained separately from, and is not used in, a data set for generating a machine learning model at the personal AI system.

7. The system of claim 1, wherein the entity is a merchant, the user is a customer of the merchant, and the access control engine is configured to adjust at the personal AI system, using the processor, the initial set of security rules to provide merchant-specific security rules for interactions between the personal AI system and the merchant.

8. The system of claim 1, wherein the user is a merchant that operates the personal AI system, the entity is a customer of the merchant, and the access control engine is used by the merchant to provide the customer with access to and account of the customer or interactions of the customer with the merchant.

9. The system of claim 8, further comprising a marketing tools intelligence agent that is configured to provide the customer, using the processor, with customer-targeted marketing materials.

10. The system of claim 1, wherein the user is a merchant that operates the personal AI system, the entity is a customer of the merchant, and the personal AI system is configured for the merchant to categorize and approve transactions with customers on a per-customer basis using the processor.

11. The system of claim 1, wherein the access control engine is further configured to control access by the second AI system to the personal AI system by specifying a decision whether to allow, hold, or deny access to the personal AI system.

12. The system of claim 1, further comprising a second interface to a personal AI security coach to assist in adjusting the initial set of security rules or the revised set of security rules.

13. A method for establishing controls for secure interactions between a personal artificial intelligence (AI) system of a user and an entity with which the user transacts business via a second AI system used by the entity, wherein the personal AI system comprises a processor, the method comprising:

automatically replicating, using the processor, at the personal AI system, security rules that are implemented at the second AI system or at a third AI system to provide an initial set of security rules at the personal AI system to control access to the personal AI system;

adjusting, using the processor, the initial set of security rules at the personal AI system based on information about the user to generate a revised set of security rules to be implemented at the personal AI system to control access to the personal AI system; and enabling interactions by the user with the entity using-the personal AI system based on the revised set of security rules;

wherein the revised set of security rules comprise rules for identifying and interacting with the entity via the second AI system.

14. The method of claim 13, further comprising generating an AI firewall to prevent access by infiltrators to interact with the personal AI system and to verify trust in the second AI system by requiring that the second AI system provide data relating to predetermined transactions with the user.

15. The method of claim 14, wherein the data relating to the predetermined transactions comprises a monetary amount of each of a plurality of recent transactions.

16. The method of claim 13, further comprising collecting, from the second AI system, data related to transactions between the user and the entity.

17. The method of claim 16, wherein the collected data related to the user is maintained separately from, and is not used in, a data set for generating a machine learning model at the personal AI system.

18. The method of claim 13, wherein the entity is a merchant, the user is a customer of the merchant, and the method further comprises adjusting the initial set of security rules at the personal AI system to provide merchant-specific security rules for interactions between the personal AI system and the merchant.

19. The method of claim 13, wherein the user is a merchant that operates the personal AI system, the entity is a customer of the merchant, and the personal AI system is used by the merchant to provide the customer with access to and account of the customer or interactions of the customer with the merchant.

20. The method of claim 13, wherein the user is a merchant that operates the personal AI system, the entity is a customer of the merchant, and the personal AI system is configured for the merchant to categorize and approve transactions with customers on a per-customer basis.

* * * * *